United States Patent [19]

Hiraga et al.

[11] 4,208,389
[45] Jun. 17, 1980

[54] PURIFICATION OF PHOSPHORIC ACID

[75] Inventors: Yoichi Hiraga; Mitsuo Kikuchi, both of Shin-nanyo, Japan

[73] Assignee: Toyo Soda Manufacturing Company, Limited, Yamaguchi, Japan

[21] Appl. No.: 9,912

[22] Filed: Feb. 6, 1979

Related U.S. Application Data

[63] Continuation-in-part of Ser. No. 855,689, Nov. 29, 1977, abandoned.

[30] Foreign Application Priority Data

Dec. 27, 1976 [JP] Japan ................................ 51-156348

[51] Int. Cl.² ............................................. C01B 25/22
[52] U.S. Cl. ................................................. 423/321 S
[58] Field of Search ......................... 423/321 R, 321 S

[56] References Cited

U.S. PATENT DOCUMENTS 1,981,145 10/1933 Keller .............................. 423/321 S

FOREIGN PATENT DOCUMENTS 2278628 2/1976 France ................................ 423/321 R
2375143 7/1978 France ................................. 423/321 S Primary Examiner—John H. Mack
Assistant Examiner—Thomas W. Roy
Attorney, Agent, or Firm—Oblon, Fisher, Spivak, McClelland & Maier

[57] ABSTRACT

Wet process phosphoric acid prepared by treating phosphate rock with sulfuric acid is purified by extracting said wet process phosphoric acid with an organic solvent containing an equilibrium concentration of phosphoric acid in a first extraction section such that substantial extraction of phosphoric acid from said wet process phosphoric acid is prevented while the organic impurities in said wet process phosphoric acid are substantially extracted and under conditions which prohibit significant extraction of iron impurities into said solvent extractant, extracting the extracted wet process phosphoric acid of reduced organic impurity content with an organic solvent in a second extraction section, returning a portion of the solvent from the second extraction section to the solvent extraction phase of the first section, removing the organic impurities from the solvent phase which is obtained from the first extraction section, and returning at least a portion of the solvent from which the organic impurities have been removed to said second extraction section.

5 Claims, 1 Drawing Figure

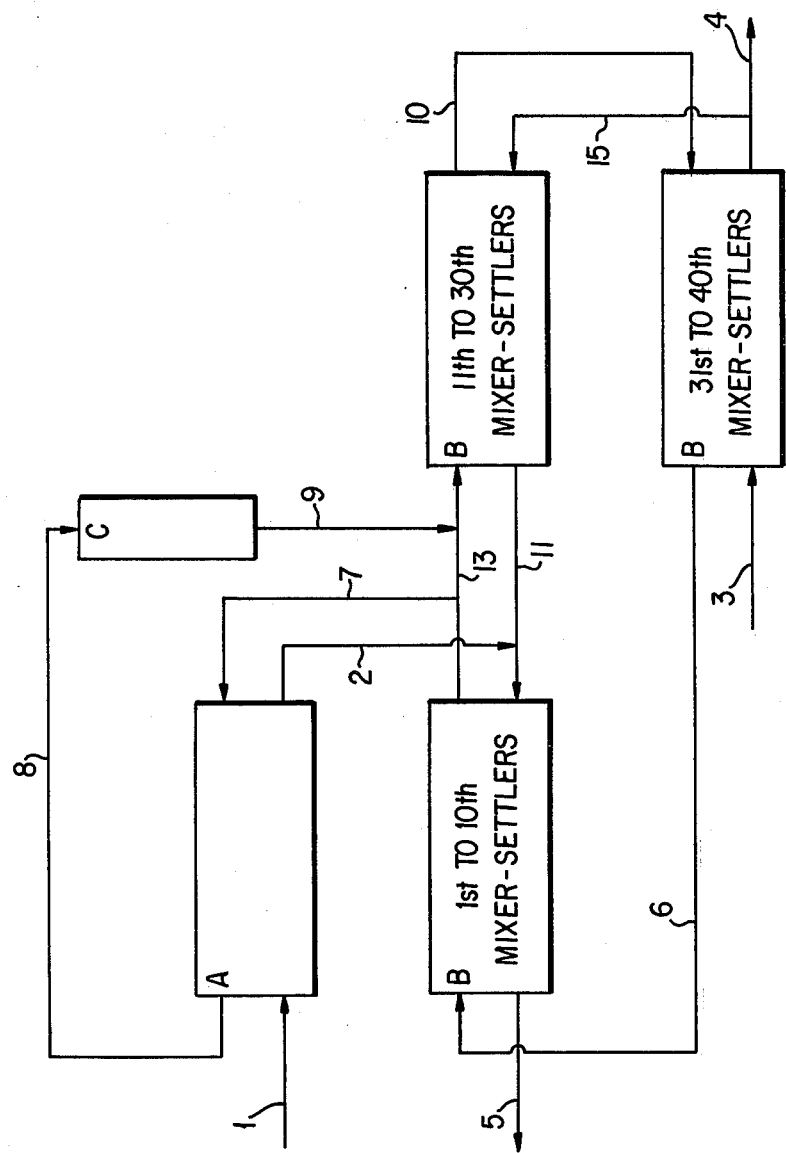

PURIFICATION OF PHOSPHORIC ACID

CROSS REFERENCE TO RELATED APPLICATIONS

This application is a continuation-in-part of application Ser. No. 855,689, filed Nov. 29, 1977, now abandoned.

BACKGROUND OF THE INVENTION

1. Field of the Invention

The present invention relates to a method of purification of wet process phosphoric acid. More particularly, it relates to a process for producing purified phosphoric acid from wet process phosphoric acid with the industrial advantage that organic impurities present in the wet process phosphoric acid are removed by a solvent extraction method.

2. Description of the Prior Art

The wet process phosphoric acid prepared by treating a phosphate rock with sulfuric acid and separating calcium sulfate usually contains impurities such as iron, aluminum, calcium, sodium, magnesium, titanium components and sulfuric acid, fluorine and silica components which are derived from the raw materials of the phosphate rock and the sulfuric acid. Accordingly, the wet process phosphoric acid has been mainly used for the preparation of fertilizers. However, substantial research and development work has been directed to the production of purified phosphoric acid useful for industrial purposes, pharmaceutical purposes and food additive applications, by extracting the wet process phosphoric acid with an organic solvent which dissolves phosphoric acid and which is not very miscible with water such as alcohols, e.g. n-butanol, isobutanol and isoamyl alcohol; ketones, e.g. methylethyl ketone and methyl isobutyl ketone; ethers, e.g., isopropyl ether; phosphoric acid esters, e.g., tributyl phosphate and amines, and back-extracting phosphoric acid from the solvent layer with water.

Normally, uncalcined phosphate rock is used for the economic production of wet process phosphoric acid. Therefore, relatively large amounts of organic impurities are incorporated in the wet process phosphoric acid which becomes a brown to black brown color because of the presence of the organic impurities. When the wet process phosphoric acid is used for the fertilizer, the organic impurities do not cause any problems. However, when a purified phosphoric acid used for industrial purposes, pharmaceutical purposes and as a food additive is produced by purifying the wet process phosphoric acid by a solvent extraction process, if a large amount of the organic impurities are present in the wet process phosphoric acid, the following disadvantages arise which inhibit smooth operation:

(a) The phosphoric acid extraction efficiency and the impurity separation efficiency are lowered.

(b) The speed of phase separation of the two liquid phases in the extraction process is very slow. Moreover, separation of the two liquid phases is not easily attained by using the conventional mixer-settler type extractor etc. and it is therefore necessary to use expensive equipment such as a centrifugal extractor to facilitate phase separation and extraction.

(c) Sometimes a stable emulsion is formed whereby the separation of the two liquid phases is impossible.

(d) A solid mass of organic impurity forms at the interface between the two liquid phases. This leads to the formation of a scale which can inhibit operation of the system for long periods of time.

For the reasons above, it has been difficult to use wet process phosphoric acid which contains organic impurities in solvent extraction processes.

Various processes for purifying wet process phosphoric acid by selectively removing the organic impurities from the wet process phosphoric acid directly or the acid extraction section have been proposed. For example, it has been proposed to pass wet process phosphoric acid which contains organic impurities through a column filled with granular active carbon before it is fed to an acid extraction process. However, in this process, the column filled with granular active carbon is frequently clogged with fine insoluble materials present in the wet process phosphoric acid as well as precipitates of fine gypsum and silicofluorides. These fine insoluble materials and the precipitates cover the surface of the active carbon which diminish the activity of the carbon as well as adversely effect the recovery coefficient. Thus, the process can not be employed for industrial purposes. When powdered active carbon is used as the carbon source instead of granular active carbon, a large amount of expensive active carbon must be used and a step in the process is required to separate the active carbon. Moreover, the treatment of the waste active carbon is a problem from the viewpoint of the environmental pollution. Accordingly, the process is not economical for industrial purposes.

Another proposed process for removing organic impurities in the solvent extraction process involves distilling the solvent phase which contains substantially no phosphoric acid such as recycled solvent, or washing the recycled solvent with an aqueous solution of an alkali metal hydroxide, or contacting the recycled solvent with active carbon or an anion exchange resin. However, in the acid extraction method, normally from 4 to 20 times by volume of the organic solvent is used to wet process phosphoric acid thereby necessitating the use of large size equipment as well as large amounts of a treating agent. Moreover, large amounts of organic solvent must be used and the loss of expensive organic solvent is substantial. Accordingly, these processes are not economically advantageous so that a need continues to exist for an economic and effective process for removing the organic impurities from wet process phosphoric acid.

A study has been conducted on the behavior of organic impurities in the solvent extraction process in order to develop a process for purifying wet process phosphoric acid by the solvent extraction process under conditions in which organic impurities are selectively removed. As a result, it has been found that most of the organic impurities present in wet process phosphoric acid are easily extracted into the organic solvent and that the organic impurities are the cause of the above-described problems. Moreover, it has been discovered that the organic impurities are substantially not back-extracted with water and therefore accumulate in the solvent phase in the acid extracting section during long periods of operation. Still further, it has been found that the separation of the two liquid phases does not deteriorate under some specific conditions even though large amounts of the organic impurities can be present.

SUMMARY OF THE INVENTION

It is an object of the present invention to provide a process for easily and economically producing a purified phosphoric acid which can be used for industrial purposes, pharmaceutical purposes as well as a food additive by selectively removing the organic impurities from wet process phosphoric acid and preventing the accumulation of the organic impurities in the solvent extraction process.

The foregoing and other objects of the present invention can be attained in a process for purifying a wet process phosphoric acid prepared by treating a phosphate rock with sulfuric acid which comprises extracting the wet process phosphoric acid with an organic solvent containing an equilibrium concentration of phosphoric acid in a first extraction section such that substantial extraction of phosphoric acid from the wet process phosphoric acid is prevented while the organic impurities in the wet process phosphoric acid are substantially extracted and under conditions which prohibit significant extraction of iron impurities into the solvent extractant;

extracting the extracted wet process phosphoric acid of reduced organic impurity content from the first extraction section with an organic solvent in a second extraction section;

returning a portion of the solvent phase from the second extraction section to the solvent extraction phase of the first extraction section;

removing the organic impurities from the solvent phase which is obtained from the first extraction section; and returning at least a portion of the solvent phase from which the organic impurities have been removed to the second extraction section.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein:

FIG. 1 is a block diagram of one embodiment of the purification of a wet process phosphoric acid in accordance with the present invention wherein A is the first extraction section, B is the second extraction section, C is a column filled with active carbon, 1 is wet process phosphoric acid, 2 is phosphoric acid (organic impurities are removed), 3 is pure water, 4 is purified phosphoric acid, 5 is a raffinate, 6 is an organic solvent, 7 is the extract phase, 8 is organic solvent phase containing organic impurities, 9 is organic solvent phase (organic inpurities are removed), 10 is purified extract phase, 11 is aqueous acid phase, 15 is purified phosphoric acid and 13 is the extract phase.

DETAILED DESCRIPTION OF THE PREFERRED EMBODIMENTS

As a result of the study on the behavior of organic impurities in the acid extraction process it has been found that the organic impurities in the wet process phosphoric acid are extracted into the organic solvent phase easier than phosphoric acid. A part of the extracted organic impurities move out of the solvent extraction process together with the phosphoric acid, however, most of the extracted organic impurities remain in the organic solvent phase so that the organic impurities gradually accumulate in the solvent phase during recycling of the solvent phase. Accordingly, even though a wet process phosphoric acid is used which contains less organic impurities in comparison to the original wet process phosphoric acid which has a higher organic impurity content, the concentration of the organic impurities in the solvent phase must increase to a sufficiently high level during a long continuous operation thus perhaps making it difficult to continue the operation.

From the above-mentioned findings, the inventors have found that it is difficult to attain an industrial purification of a wet process phosphoric acid by the solvent extraction process without removing substantial amounts of the organic impurities before the solvent extraction or without selectively removing the organic impurities from the solvent extraction process. The separability of the two liquid phases which are contaminated by organic impurities depends upon the concentration of phosphoric acid and the concentration of metal compound impurities. If the concentrations of phosphoric acid and the metal compound impurities are maintained at high levels such as more than 20 wt.% of $P_2O_5$ and more than 2 wt.% of $R_2O_3$ (R: metallic element) in the aqueous solution phase as the original wet process phosphoric acid, the separation of the two phases can be easily achieved without a sacrifice in the separability of the two phases by using such conventional extractors as rotary disc type extracting towers or a mixer-settler type extractors.

As the result of further study based on the behavior of the organic impurities in the solvent extraction process, it has been found that wet process phosphoric acid containing organic impurities can be easily purified by an organic solvent extraction process in which organic impurities are selectively extracted from wet process phosphoric acid in a first extraction section followed by a second extraction section for further extracting and purifying wet process phosphoric acid with an organic solvent. A portion of the phosphoric acid-organic solvent phase or extract phase is discharged from the second extraction section and then recycled to the solvent in the first extraction section for the extraction of organic impurities.

The second extraction section in the process of the present invention comprises an extraction battery for extracting phosphoric acid from the treated phosphoric acid effluent of the first extraction section into the solvent phase, and a scrubbing battery for removing the inorganic impurities extracted into the solvent phase together with the phosphoric acid by contacting the solvent phase with water or an aqueous solution of phosphoric acid of high purity and a stripping battery for recovery of the phosphoric acid component by contact with water. The extracting method can be any known method. In the specification, the term "extract phase" means the solvent phase which contains phosphoric acid and the inorganic impurities obtained from the extraction battery. The extract phase in the second extraction section has a composition which is substantially in equilibrium with the wet process phosphoric acid in the concentrations of phosphoric acid and the metal compound impurities, such that substantial quantities of phosphoric acid and the metal compound impurities are not extracted into the solvent phase and only the organic impurities are selectively extracted. Thus, the separation of the two liquid phases can be achieved at a high enough separation speed when the wet process phosphoric acid is contacted with the extract phase in the first extraction section. On the other hand, a portion of the extract phase is removed so that accumulation of the organic impurities in the second extraction section can be prevented and the problems caused by the organic impurities in the second extraction section can be prevented.

The process of the present invention involves a first section in which organic impurities are selectively extracted, a second section for separating phosphoric acid from metal compound impurities and a step in which a part of the extract phase in the second extraction section is discharged for use as the solvent in the first extraction section. Because a part of the extract phase is discharged from the second extraction section, it is necessary to maintain the flow rate ratio of the two phases in the second section constant by adding amounts of organic solvent in order to keep the extraction coefficient and the purification coefficient constant.

The organic solvent which is freed of organic impurities after use in the first section can be used as additional organic solvent. Thus, the loss of expensive organic solvent can be substantially reduced by such recycling and in fact, it is essential in the present process to remove the organic impurities from the organic solvent phase obtained from the first section and to recycle the solvent to the second section. It is also necessary to extract the organic impurities from the wet process phosphoric acid in the first extraction section under conditions in which substantially no iron impurities are extracted for the following reasons.

Normally, in conventional solvent extraction of wet process phosphoric acid in a multi-step sequence, the metal compound impurities in the wet process phosphoric acid are not easily extracted into the organic solvent phase. However, when enough hydrochloric acid is present, the iron impurities form a chloride complex which is easily extracted into the organic solvent phase. Thus, in a two step extraction process, when hydrochloric acid is used in a the first step, the iron impurities which contains wet process phosphoric acid form a chloride complex and extraction of iron impurities into the solvent occurs. The extracted acid which still contains iron impurities which form a chloride complex passes into the second step where it is extracted with solvent which still contains iron impurities. Under these conditions, even though hydrochloric acid is not used in the second step, it is substantially impossible to separate iron impurities from phosphoric acid component in the second step. Because, a large amount of hydrochloric acid which is contained in the extracted acid causes that iron impurities in the second step contines to be in the form of chloride complex. Accordingly, it is impossible to produce a purified phosphoric acid contained no iron impurities.

Accordingly, it is necessary that the iron impurities in the wet process phosphoric acid be completely extracted into the organic solvent phase in the first section so that a phosphoric acid containing no iron impurities is fed to the second section and so that the organic impurities and the iron impurities are removed from the solvent phase before recycling the solvent phase to the second section. However, it is essentially impossible to extract substantial amounts of iron impurities present in wet process phosphoric acid in the first step because a large amount of the organic solvent and many extraction steps are needed. Moreover, if iron impurities are extracted in the first step, (a) the separability of the two liquid phases in the first step deteriorates;

(b) the separation of the iron impurities from phosphoric acid is difficult which causes losses of phosphoric acid when iron impurities are separated from the phosphoric acid; and (c) the iron impurities precipitate as iron phosphate and iron hydroxide in the step in which the organic impurities are separated from the solvent phase, thereby forming a large amount of scale which prevents continued operation. Thus, under conventional multi-step extraction conditions it is impossible to produce a purified phosphoric acid by an industrial process which is suitable for industrial purposes, useful as a food additive, and useful for pharmaceutical purposes.

The extraction conditions in the second extraction section are the same as employed in conventional solvent extraction systems. Thus, the impure aqueous acid solution (raffinate) discharged from the second extraction section contains essentially all of the iron and other mineral impurities present in the starting crude wet process phosphoric acid.

As is clear from the above discussion, the problems caused by the organic impurities in the solvent extraction process can be overcome in the present process by combining a first extraction section with a second extraction section and operating the first extraction section under conditions in which no iron impurities are extracted whereby the extracting operation is easy and a purified phosphoric acid can be easily and economically obtained from a wet process phosphoric acid which contains organic impurities. The purified phosphoric acid obtained by the process of the present invention has a high purity and is suitable for industrial use as a food additive and for pharmaceutical purposes because it does not contain significant amounts of any impurity nor organic impurities which are present in the starting wet process phosphoric acid.

The first extraction section in the process of the present invention can be a batch process or a continuous process. It is preferable to employ a counter-current continuous extracting process.

The amount of the solvent used in the first extraction section is dependent upon the kind of organic solvent employed and mainly the amount of organic impurities in the wet process phosphoric acid. The amount of the organic impurities in the wet process phosphoric acid is dependent upon the producing district and the kind of the phosphate rock. Accordingly, the amount of the solvent used in the first extraction section can be defined and it is usually in a range of less than 3.0 vol. parts per 1 vol. part of the wet process phosphoric acid.

For example, when Morocco phosphate rock is used, the amount of the solvent is in a range of 0.2 to 0.5 vol. part per 1 vol. part of the wet process phosphoric acid and when the Florida phosphate rock is used, the amount of the solvent is in a range of 0.4 to 1.0 vol. part per 1 vol. part of the wet process phosphoric acid, whereby more than 80 wt.% especially more than 90 wt.% of the organic impurities contained in the wet process phosphoric acid can be removed.

In order to substantially prevent the extraction of the iron impurity in the first extraction section, the concentrations of hydrochloric acid and chloride are controlled. The concentration of chloride ions is depending upon the kind of the organic solvent. The concentration can be easily decided by the test for finding no extraction of iron impurity. When the chloride ion concentration in the organic solvent phase is usually kept in less than 10 g/liter as Cl, the iron impurity is not substantially extracted.

It is necessary to remove the organic impurities from the organic solvent phase obtained in the first extraction section and to recycle the resulting organic solvent to the second extraction section. The method of removing the organic impurities can be suitable conventional method to attain the purpose. For example, the organic impurities can be removed by contacting the organic solvent phase obtained in the first section with a small amount of water to selectively recover phosphoric acid component from the organic solvent phase, and washing it with an aqueous solution of an alkali metal hydroxide or distilling it or treating it with active carbon.

The recovered aqueous solution of phosphoric acid is fed with the wet process phosphoric acid to the first extraction section and the recovered organic solvent is recycled to the second extraction section. When the organic solvent phase containing the organic impurities is directly treated with active carbon, only the organic impurities can be selectively adsorbed by active carbon and both of the phosphoric acid component and the organic solvent can be simultaneously recovered, advantageously. At least part of the recovered organic solvent is recycled to the second extraction section and the remainder is recycled to the first extraction section. Accordingly, the amount of the extract phase recycled to the first extraction section is the same with the amount of the solvent recycled from the first extraction section to the second extraction section and it is usually in a range of 0.01 to 0.2 vol. part of a total organic solvent.

The step of removing the organic impurities in the process of the present invention is effective and economical in comparison with the conventional processes because the volume of the treated solution is small and the solution containing higher content of the organic impurities is treated.

The organic solvent used in the process of the present invention should be the same in the first extraction section and the second extraction section. The organic solvent can be the conventional solvents for purifying phosphoric acid. From the viewpoints of the extraction of the organic impurities, the separatability of the impurities from phosphoric acid, the cost, the availability, the stability and the handling, it is preferable to use alcohols especially, n-butanol and isoamyl alcohol and ketones especially, methyl isobutyl ketone.

In the present invention, the wet process phosphoric acid include the conventional wet process phosphoric acid prepared by treating a phosphate rock with sulfuric acid and separating calcium sulfate and the phosphoric acid solution obtained by concentrating the wet process phosphoric acid solution and the phosphoric acid solution obtained by removing excess of sulfuric acid and hydrogen silicofluoride in a chemical method and the phosphoric acid solution obtained by removing a part of organic impurities by treating the wet process phosphoric acid with an oxidizing agent, etc.

The present invention will be further illustrated by certain examples whereby the terms of "%" and "ppm" mean "% by weight" and ppm by "weight".

EXAMPLE 1

A wet process phosphoric acid which was prepared by treating an uncalcined phosphate rock produced in Morocco with sulfuric acid was continuously purified by the process shown in FIG. 1.

One vol. part of the wet process phosphoric acid was fed through line 1 into the first mixer-settler in the first organic impurity extracting section (A) having 5 mixer-settlers, and 0.5 vol. part of a purified extract phase was discharged from the 10th mixer-settler in the second acid extracting section (B) having 40 mixer-settlers through line 7 to the 5th mixer-settler in the first section (A) so as to counter-currently contact them, whereby the phosphoric acid solution obtained containing no organic impurities and having the following composition was discharged from section (A) through line 2 into the 10th mixer-settler in the second section (B). An aqueous impure acid solution containing most of the iron and other mineral impurities originally present in the starting crude wet process phosphoric acid was discharged from the system from the first mixer settler through line 5 in second section (B). In the second section (B), phosphoric acid from the aqueous phosphoric acid solution was extracted into the organic solvent phase in the 1st to 10th mixer-settlers and the extract phase obtained containing inorganic impurities was discharged through line 13 into the aqueous phase in the 11th to 30th mixer-settlers. Aqueous phosphoric acid solution was discharged from the 11th mixer-settler through line 11 into the 10th mixer-settler. The 31st to 40th mixer-settlers were used for recovering phosphoric acid from the purified extract phase discharged from the 11th to 30th mixer-settlers through line 10. Six vol. parts of water saturated n-butanol obtained from the 40th mixer-settler were fed through line 6 into the first mixer-settler in the second section B and 2 vol. parts of pure water were fed through line 3 into the 40th mixer-settler. Purified phosphoric acid was discharged from the 31st mixer-settler of the system through line 4. Moreover, 0.6 parts by volume of the purified phosphoric acid discharged through line 4 was fed to the 30th mixer-settler via line 15.

The water saturated n-butanol was fed to the 1st mixer-settler in the second section (B). The organic solvent phase obtained from the first section A containing a large amount of organic impurities was discharged from the first section (A) via line 8. The discharged solvent phase was treated by passing the same through a column (C) filled with Pittsburgh granular carbon CAL to remove the organic impurities and it was recycled back into the system through the 11th mixer-settler in the second section (B) via line 9. As the result, most of the organic impurities contained in the wet process phosphoric acid were removed in the first section to obtain a colorless purified phosphoric acid.

The organic solvent phase in the second section was slightly colored at the initiation. However, the accumulation of the organic impurities was not found. The separatability of the two phases in the first section and the second section was not changed whereby the operation was smoothly continued for a long time.

The purified phosphoric acid was concentrated to obtain the conc. purified phosphoric acid having the following composition.

Table 1:

| | Wet process phosphoric acid | Phosphoric acid (organic impurities are removed) | Conc. purified phosphoric acid |
|---|---|---|---|
| $P_2O_5$ | 33% | 32% | 61.5% |
| Ca | 0.52 | 0.50 | 0.0003 |
| Fe | 0.16 | 0.16 | 0.0002 |
| Al | 0.25 | 0.24 | 0.0003 |
| Ti | 0.025 | 0.024 | 0.0003 |
| Cl | trace | trace | — |
| Color | black-brown | greenish blue | pale yellow |

Reference 1

In accordance with the process of Example 1 except employing the first organic impurity extracting section (A) to directly feed the wet process phosphoric acid to the 10th mixer-settler of the second acid extracting section (B) and treating the water saturated n-butanol phase containing substantially no phosphoric acid obtained from the 40th mixer-settler with a column (C) filled with active carbon and recycling the treated solvent to the 1st mixer-settler, the purification of the wet process phosphoric acid was carried out.

The resulting purified phosphoric acid was concentrated under a reduced pressure to the concentration of 61.5% as $P_2O_5$. The conc. purified phosphoric acid had brown color. The function of the column filled with active carbon was about 1/5 in comparison with that of Example 1.

Reference 2

In accordance with the process of Example 1 except using a wet process phosphoric acid prepared by treating the uncalcined phosphate rock produced in Morocco with hydrochloric acid, the purification of the wet process phosphoric acid was carried out. As the result, the accumulation of the organic impurities in the second acid extracting section was not found and the operation was smoothly continued, however, a large amount of iron impurity was contained in the purified phosphoric acid and the purity was low because the iron impurity was extracted in the first organic impurity extracting section (A). The compositions of the phosphoric acids are shown in Table 2.

Table 2:

| | Wet process phosphoric acid | Phosphoric acid (organic impurities are removed) | Conc. purified phosphoric acid |
|---|---|---|---|
| $P_2O_5$ | 9.5% | 9.5% | 61.5% |
| Ca | 8.6 | 8.6 | 0.001 |
| Fe | 0.05 | 0.03 | 0.25 |
| Al | 0.07 | 0.07 | 0.001 |
| Ti | 0.007 | 0.007 | 0.0003 |
| Cl | 9.1 | 8.9 | 0.04 |
| Color | brown | yellowish green | yellow |

EXAMPLE 2

In accordance with the process of Example 1 except using isoamyl alcohol instead of n-butanol and adding 35% HCl in the 1st mixer-settler of the second section so as to give the chlorine conc. 5 to 8 g/l as Cl, the purification of the wet process phosphoric acid was carried out.

As the result, the extraction of iron impurity to the organic solvent phase in the first section was not found. The result was the same with that of Example 1.

EXAMPLE 3

In accordance with the process of Example 1 except using methyl isobutyl ketone instead of n-butanol, the purification of the wet process phosphoric acid was carried out. The result was the same with that of Example 1.

Having now fully described this invention, it will be apparent to one of ordinary skill in the art that many changes and modifications can be made thereto without departing from the spirit of scope of the invention set forth herein.

What is claimed as new and intended to be covered by letters patent is:

1. A process for purifying wet process phosphoric acid prepared by treating a phosphate rock with sulfuric acid, which comprises:

extracting said wet process phosphoric acid wherein the concentrations of $P_2O_5$ and $R_2O_3$ are greater than 20 wt.% and greater than 20 wt.% respectively, with an organic solvent containing an equilibrium concentration of phosphoric acid in a first extraction section such that substantial extraction of phosphoric acid from said wet process phosphoric acid is prevented while the organic impurities in said wet process phosphoric acid are substantially extracted and under conditions which prohibit significant extraction of iron impurities into said solvent extractant;

extracting the extracted wet process phosphoric acid of reduced organic impurity content from said first extraction section with an organic solvent in a second extraction section;

returning a portion of the solvent phase from the second extraction section to the solvent extraction phase of said first extraction section;

removing the organic impurities from the solvent phase which is obtained from the first extraction section; and returning at least a portion of the solvent phase from which the organic impurities have been removed to said second extraction section.

2. The process of claim 1, wherein the chlorine concentration in the organic solvent phase of the first section is maintained less than 10 g/l as Cl.

3. The process of claim 1, wherein the organic solvent containing organic impurities obtained in the first section is treated with active carbon to remove impurities therefrom.

4. The process of claim 1, wherein the phosphate rock is an uncalcined phosphate rock.

5. The process of claim 1, wherein the organic solvent of said first and second extraction sections is selected from the group consisting of n-butanol, isoamylalcohol and methylisobutylketone.

* * * * *